(12) United States Patent
Kaihlaniemi

(10) Patent No.: US 6,370,591 B2
(45) Date of Patent: *Apr. 9, 2002

(54) METHOD AND APPARATUS FOR RUNNING SIMULTANEOUS APPLICATIONS THROUGH THE SAME PORT USING SUPPLEMENTARY DRIVERS THROUGH A MAIN DRIVER

(75) Inventor: Iiro Kaihlaniemi, Tampere (FI)

(73) Assignee: Nokia Mobile Phones Ltd., Espoo (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/940,926

(22) Filed: Sep. 30, 1997

(51) Int. Cl.⁷ ................................................. G06F 9/54
(52) U.S. Cl. ........................ 709/321; 709/324; 709/327
(58) Field of Search ................................. 709/301, 305, 709/321.327, 324

(56) References Cited

U.S. PATENT DOCUMENTS

| | | | |
|---|---|---|---|
| 5,263,178 A | | 11/1993 | Liukkonen ................... 455/76 |
| 5,353,328 A | | 10/1994 | Jokimies ...................... 379/58 |
| 5,392,282 A | | 2/1995 | Kiema .......................... 370/77 |
| 5,490,235 A | | 2/1996 | Von Holten et al. ....... 395/2.79 |
| 5,640,394 A | * | 6/1997 | Schrier et al. .............. 370/389 |
| 5,655,092 A | | 8/1997 | Ojala .......................... 395/309 |
| 5,657,371 A | | 8/1997 | Suomi et al. ............... 455/418 |
| 5,732,282 A | * | 3/1998 | Provino et al. ............... 710/10 |
| 5,805,636 A | * | 9/1998 | Rao et al. .................... 375/222 |
| 5,815,682 A | * | 9/1998 | Williams et al. ....... 395/500.46 |
| 5,884,103 A | * | 3/1999 | Terho et al. ................... 710/72 |
| 6,009,476 A | * | 12/1999 | Flory et al. ................. 709/301 |

FOREIGN PATENT DOCUMENTS

WO    WO 96/35286    11/1996

OTHER PUBLICATIONS

Matthews, "Porting VxDs from Windows 3.1 to Windows 95", Dr. Dobb's Journal, Nov. 1995.*

* cited by examiner

Primary Examiner—Zarni Maung
Assistant Examiner—George Lawrence Opie
(74) Attorney, Agent, or Firm—Perman & Green, LLP

(57) ABSTRACT

A computer has a hard disc drive (HDD) (12), a random access memory (RAM) (13), and an operating system (9) in which at least two communications modules (10,16) are provided for interfacing applications (7,8) running on the computer to an i/o device (1,4,5,6). The computer has a serial input/output port (5) to which is coupled a mobile telephone. The computer additionally comprises a main driver (14) stored on the HDD (12) and defining the communications protocol for the input/output port 5 and the telephone 1. A first supplementary driver (11) is registered to a first of the communication modules (10), the first supplementary driver (11) being arranged in use to cause the main driver (14) to be loaded from the HDD (12) to the RAM (13) and also to transfer a function interface (18) for the main driver (14) to the first communications module (10). A second supplementary driver (17) is registered to a second of the communication modules (16), the second supplementary driver (17) being arranged to transfer a function interface (18) for the main driver (14) to the second communications module 16).

22 Claims, 1 Drawing Sheet

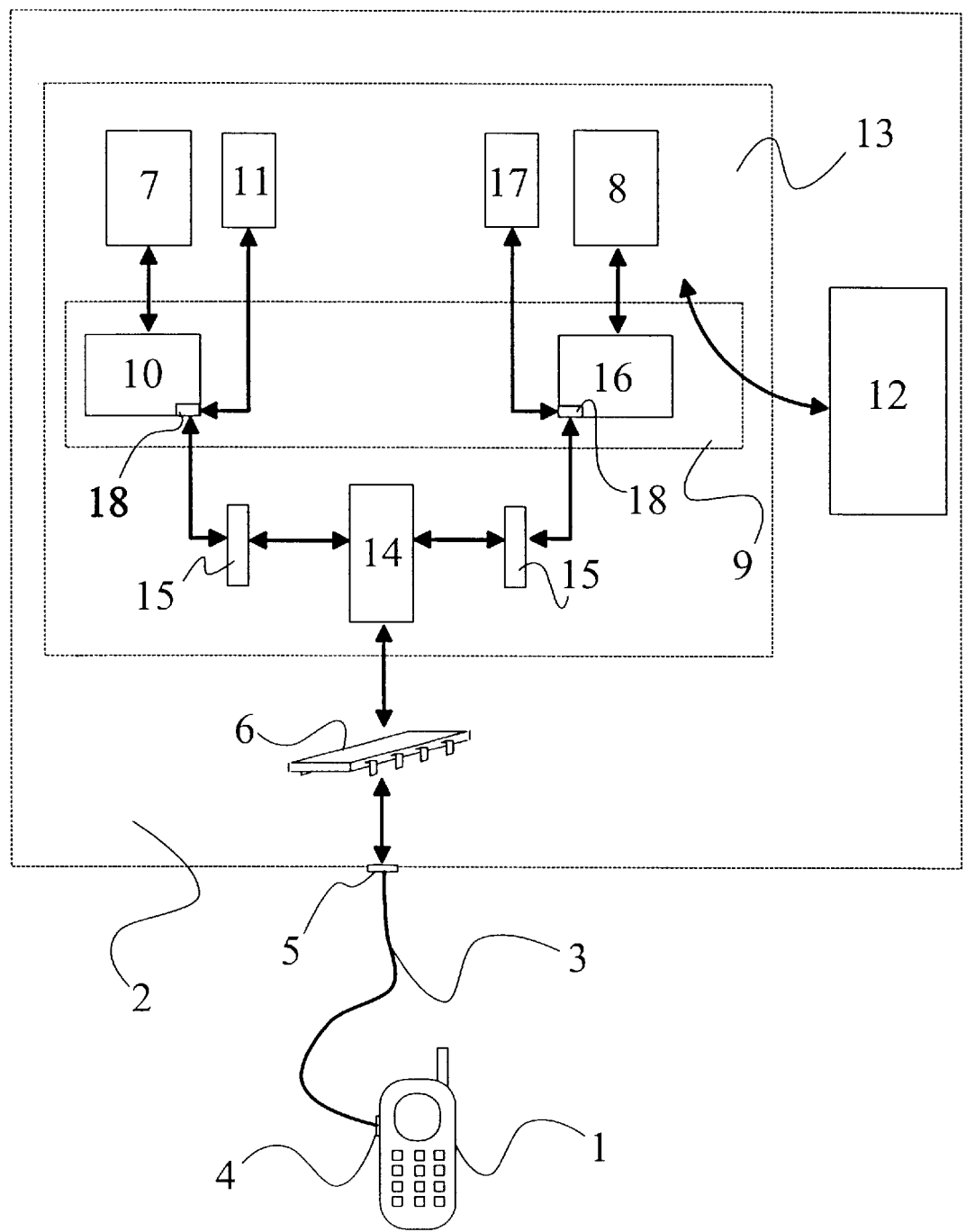

METHOD AND APPARATUS FOR RUNNING SIMULTANEOUS APPLICATIONS THROUGH THE SAME PORT USING SUPPLEMENTARY DRIVERS THROUGH A MAIN DRIVER

The present invention relates to drivers for computers and in particular, though not necessarily, to drivers for interfacing input/output devices of a computer with software applications running on the computer.

BACKGROUND OF THE INVENTION

The Microsoft Windows 95 and NT (Trade Marks) operating systems have established themselves as the dominant operating system for personal computers (PC). Furthermore, it can be expected that in the near future derivatives of the Windows (™) systems will continue to hold this position. As such, designers of software applications intended to run on PCs are to a great extent constrained by the need to enable their applications to run under the Windows (™) operating system.

In addition to the basic software 'kernel', which provides the base operating system (including file i/o services, memory management, and task scheduling), Windows 95 and NT (™) comprise a User component (USER.EXE) which allows applications to be interfaced to internal and external devices such as hard disc drives, memory chips, and input/output ports. This architecture is used so that all applications can use a common input/output protocol regardless of the input/output (i/o) device with which they are communicating. It is the interface modules which handle 'translation' of the common protocol into i/o device specific protocols and vice versa.

The central communications component of Windows 95 (Trade Mark) is the virtual communications driver or module VCOMM which manages access to 'com' ports and printer ports. These ports require a single asynchronous data stream and are in fact 'virtual' ports defined by an actual physical port in combination with a virtual device driver (VxD) termed a 'port driver'. Upon installation, Windows 95 creates a com port for each physical serial port of the computer. Typically there are two such physical ports giving rise to com ports 'Com1' and 'Com2'. Other (virtual) com ports may be added as required. Corn ports may be selected from the 'System' window in the 'Control Panel'. VCOMM is also present in Windows 3.11 and can be installed in Windows 3.1.

WO 96/35286 describes a mobile telephone coupled to a personal computer and more particularly a software program for operating the phone through an i/o port of the computer. This port may be a serial port or a parallel port, e.g. PCMCIA. The controlling application in such a system may be, for example, the WinFax (™) application which enables facsimiles to be written on the computer and transmitted via the connected phone. The application also enables incoming facsimiles to be received on the computer. WinFax is able to communicate with the phone through VCOMM and a standard virtual serial port (i.e. a physical port in combination with a serial VxD customised for the phone) registered to VCOMM. This virtual port is typically installed as 'Com3'.

In the case of the mobile telephone coupled to a computer, it is extremely desirable to be able to monitor the status of the phone, e.g. call in progress, incoming call received etc, via the computer and to be able to provide a visual indication of that status on the computer's display. This is especially so where the phone has no user interface and is intended solely for use with a computer. To achieve this monitoring, it is possible to run a custom monitoring application on the computer which is interfaced with the phone through VCOMM and a virtual port.

It is also extremely desirable to be able to run a monitoring application of the type described above at the same time as another application, e.g. WinFax, is being used to control the connected telephone. However, as the same virtual port cannot be used for both applications, this requires the installation of two additional com ports (e.g. Com3 and Com4) although both com ports share the same VxD. The resulting large number of com ports appearing on the 'System' Control Panel is likely to confuse the user and may result in com ports being incorrectly registered by the user.

A possible solution to this problem is to interface the control application (e.g. WinFax) to the phone using VCOMM and to interface the monitoring application through another Windows (™) communications module known as DeviceIOcontrol. DeviceIOcontrol is a more primitive interface than VCOMM but is well suited to relatively simple applications. The virtual serial port registered to DeviceIOcontrol for the monitoring application will not appear on the System Control Panel and only Com3, registered to WinFax, will appear there.

In order to minimise the space occupied by the two additional virtual ports in RAM, both ports should utilise the same VxD. However, a problem arises when DeviceIOcontrol attempts to register the phone specific VxD after the control application has previously registered that same VxD. Upon first registration, VCOMM loads the VxD from the computer's hard disc into random access memory (RAM). The address at which a registration table can be found is also provided to VCOMM, which table contains the location of VxD functions which can be called by VCOMM. When DeviceIOcontrol subsequently tries to register with the VxD, it finds that the VxD has already been loaded to RAM and the address of the registration table (and any other necessary information) is not provided to DeviceIOcontrol. DeviceIOcontrol is therefore unable to communicate with the telephone.

It will be appreciated that this problem arises wherever two or more applications are required to access the same i/o device, with the same VxD, but using different communications modules.

SUMMARY OF THE INVENTION

It is an object of the present invention to overcome or at least mitigate the problems noted in the preceding paragraphs. This and other objects are met by providing a main driver for the i/o device, and two or more supplementary drivers which can be registered with respective communications modules.

Upon registration of a supplementary driver, that driver registers the main driver to the associated communications module, loading the driver to RAM memory if this has not already been done. Regardless of whether or not the main driver has already been loaded however, the supplementary driver provides the main driver function interface to the associated communications module.

According to a first aspect of the present invention there is provided a method of operating a computer having a non-volatile memory, a random access memory (RAM), at least one input/output (i/o) device, and an operating system in which at least two communications modules are provided for interfacing applications running on the computer to said i/o device, the method comprising:

registering a first supplementary driver to a first of the communication modules, whereupon the first supplementary driver causes a main driver, which defines the communications protocol for said i/o device, to be loaded from the non-volatile memory to the RAM and also transfers a function interface for the main driver to said first communications module; and subsequently registering a second supplementary driver to a second of the communication modules, whereupon the second supplementary driver transfers a function interface for said main driver to said second communications module.

Preferably, said operating system is a Windows (™) operating system, for example Windows 95, and the two communications modules are VCOMM and DeviceIOcontrol.

The term 'i/o device' is used here to denote a receiver and/or generator of digital data. The device may be for example a physical i/o port in combination with a physical device, an internal memory unit, or a software module.

In one embodiment, said i/o device comprises a serial interface port, e.g. an RS232 port. More preferably, said communications protocol is a protocol for communicating with a mobile telephone coupled to a serial interface port of the computer. Alternatively, the i/o device may comprise a parallel port, e.g. a PCMCIA slot.

Preferably, said function interface which is transferred to the communications modules comprises the address of a registration (or main driver access address) table.

According to a second aspect of the present invention there is provided a storage medium having recorded thereon at least said first and second supplementary drivers of the above first aspect of the invention.

Preferably, the storage medium also has recorded thereon said main driver.

According to a third aspect of the present invention there is provided a computer programmed to perform the method of the above first aspect of the invention.

According to a fourth aspect of the present invention there is provided a computer having a non-volatile memory, a random access memory (RAM), at least one input/output (i/o) device, and an operating system in which at least two communications modules are provided for interfacing applications running on the computer to said i/o device, the computer comprising:

a main driver stored in the non-volatile memory and defining the communications protocol for said i/o device;

a first supplementary driver for registration to a first of the communication modules, the first supplementary driver being arranged in use to cause the main driver to be loaded from the non-volatile memory to the RAM and also to transfer a function interface for the main driver to said first communications module; and a second supplementary driver for registration to a second of the communication modules, the second supplementary driver being arranged to transfer a function interface for said main driver to said second communications module.

Preferably, said operating system is a Windows (™) operating system, and said communications modules are VCOMM and DeviceIOcontrol.

Preferably, said i/o device is a mobile telephone coupled to a serial interface port of the computer.

BRIEF DESCRIPTION OF THE DRAWING

For a better understanding of the present invention and in order to show how the same may be carried into effect reference will now be made, by way of example, to the accompanying drawing which shows schematically a computer in which two applications are interfaced to a mobile telephone through respective communications modules.

DETAILED DESCRIPTION OF THE INVENTION

There is illustrated schematically in the attached drawing a mobile telephone 1 coupled to a personal computer 2. More particularly, a cable 3 connects a serial input/output port 4 of the telephone 1 to serial input/output port 5 of the computer. Typically, these ports 4,5 are RS232 ports. Data is passed through the cable 3 in the form of an asynchronous stream of digital data and the cable 3 comprises respective lines for incoming and outgoing data and lines for so-called 'handshake' signals.

Considering the personal computer 2, data is coupled to and from the computer's i/o port 5 through a UART (Universal Asynchronous Receiver Transmitter) circuit 6. Data generally originates from, or terminates at, one or more application programs, and two such application programs are denoted in FIG. 1 with reference numerals 7 and 8. For the purpose of illustration, reference numeral 7 denotes the WinFax (™) application, which is an application able to send and receive facsimile transmissions, and reference numeral 8 denotes a phone monitoring application. The latter application 8 is able to monitor the operation of the connected phone 1 and to provide a visual indication on the computer's display (not shown) of such things as remaining phone battery life, cellular field strength, and on-hook/off-hook status. Both of these applications can be run simultaneously using a multi-tasking mode of operation and are stored (or at least their currently active parts are stored) in a random access memory (RAM) 13 of the computer 2.

The computer 2 is operated by the Windows (™) operating system 9 which resides in the RAM 13. The operating system provides an interface for the applications 7,8 to hardware and software devices such as the display, memory, keyboard, mouse etc. More particularly, and as has already been outlined above, Windows (™) comprises a communications module 10 called VCOMM, which is a software module which the WinFax (™) application 7 uses to communicate with the mobile phone 1. Assuming that no phone related applications are currently open, when the WinFax (™) application is opened, WinFax (™) 7 registers with VCOMM 10, advising VCOMM that VCOMM should register a first supplementary software driver 11 currently stored on the computer's hard disc drive (HDD) 12 (other non-volatile storage means may be used as an alternative to a HDD, e.g. CD ROM). Registration involves copying this supplementary driver 11, by way of the operating system 9, from the HDD 12 to the computer's RAM 13. The supplementary driver 11 contains a relatively small amount of code, e.g. 50 lines, which is run by the computer's CPU (not shown). This causes a main software driver 14 to be copied by the operating system from the HDD 12 to the RAM 13. This main driver contains a main driver access address table 15, and registration of the supplementary driver 11 also causes the address (i.e. memory location) 18 of the access table 15 to be passed to VCOMM 10.

The main driver is much larger than the supplementary driver, e.g. 100,000 lines, and comprises a number of routines which define the protocol for communicating with the connected telephone 1. For example, the phone 1 is designed to receive and transmit data in a particular format and certain routines of the main driver 14 provide for converting application generated data into this format and vice versa.

When an output data request is made from the WinFax application to VCOMM, VCOMM uses the access address table 15 to obtain the addresses of the necessary routines in the main driver 14. Output data received from WinFax is then processed by VCOMM 10 in accordance with the called routines and is transferred to the telephone via the main driver 14, the UART circuit 6, and the i/o ports 4,5. VCOMM 10 performs a similar function for incoming data.

With WinFax (™) 7 still running, the user may wish to open the monitoring application 8. When this is opened, the application advises DeviceIOcontrol 16 (a second software communications module of the Windows (™) operating system) that it wishes to communicate with the mobile telephone 1. Such communication requires the use of the main driver 14 already transferred to RAM 13. However, in order to access the main driver 14, DeviceIOcontrol 16 must obtain the address 18 of the main driver access address table 15. DeviceIOcontrol 16 therefore registers a second supplementary driver 17, similar to the first supplementary driver 11, transferring the second supplementary driver 17 from the HDD 12 to the computer's RAM 13.

The second supplementary driver 17 is run, and it is determined that the main driver 14 is already loaded into RAM 13. There is therefore no need to repeat this operation. The address 18 of the main driver access address table 15 is then again copied to RAM 13 where it is made available to DeviceIOcontrol 16. Thereafter, DeviceIOcontrol 16 can use the access address table 15 to access the main driver 14 and to facilitate communication between the monitoring application 8 and the telephone 1.

Conflict between the two applications is avoided by the main driver 14 which allocates transmission slots according to demand.

It will be appreciated that modifications may be made to the above described embodiment without departing from the scope of the present invention. For example, it will be appreciated that it is irrelevant which of the two applications 7,8 are opened first. If the monitoring application 8 is opened before WinFax (™) 7, the supplementary driver 17 will be registered first and it is this driver which will load the main driver 14 into the RAM.

What we claim is:

1. A method of operating a computer having a non-volatile memory, a random access memory (RAM), at least one input/output (i/o) device, and an operating system in which at least two communications modules are provided for interfacing applications running on the computer to said i/o device, the method comprising:
    registering a first supplementary driver to a first of the communication modules, whereupon the first supplementary driver causes a single main driver, which defines the communications protocol for said i/o device, to be loaded from the non-volatile memory to the RAM and also transfers a function interface for the main driver to said first communications module; and
    subsequently registering a second supplementary driver to a second of the communication modules, whereupon the second supplementary driver transfers a function interface for the same single main driver to said second communications module.

2. A method according to claim 1, wherein said operating system is a personal computer operating system capable of running communication modules VCOMM and DeviceIOcontrol together.

3. A method according to claim 1, wherein said i/o device is a serial interface port and said communications protocol is a protocol for communicating with a mobile telephone coupled to said serial interface port.

4. A storage medium for operating with a computer having a non-volatile memory, a random access memory (RAM), at least one input/output (i/o) device, and an operating system in which at least two communications modules are provided for interfacing applications running on the computer to said i/o device, said storage medium having recorded thereon:
    a first supplementary driver for a first of the communication modules, whereupon the first supplementary driver causes a single main driver, which defines a communications protocol for said i/o device, to be loaded from the non-volatile memory to the RAM and also transfers a function interface for the main driver to said first communications module; and
    a second supplementary driver for a second of the communication modules, whereupon the second supplementary driver transfers a function interface for the same single main driver to said second communications module.

5. A storage medium according to claim 4 on which is additionally recorded said single main driver.

6. In a computer having a non-volatile memory, a randome access memory (RAM), at least one input/output (i/o) device, and an oerating system in which at least two communications modules are provided for interfacing applications running on the computer to said i/o device, said computer having program code which causes the computer to:
    register a first supplemantary driver to a first of the communication modules, whereupon the first supplementary driver causes a single main driver, which defines the communications protocol for said i/o device, to be loaded from the non-volatile memory to the RAM and also transfers a function interface for the main driver to said first communications module; and
    subsequently register a second supplementary driver to a second of the communication modules, whereupon the second supplementary driver transfers a function interface for the same single main driver to said second communications module.

7. A computer having a non-volatile memory, a random access memory (RAM), at least one input/output (i/o) device, and an operating system in which at least two communications modules are provided for interfacing applications running on the computer to said i/o device, the computer comprising:
    a single main driver stored on the non-volatile memory and defining the communications protocol for said i/o device;
    a first supplementary driver for registration to a first of the communication modules, the first supplementary driver being arranged in use to cause the single main driver to be loaded from the non-volatile memory to the RAM and also to transfer a function interface for the single main driver to said first communications module; and
    a second supplementary driver for registration to a second of the communication modules, the second supplementary driver being arranged to transfer a function interface for said same, single main driver to said second communications module.

8. A computer according to claim 7, wherein said operating system is a personal computer capable of running communication modules VCOMM and DeviceIOcontrol together.

9. A computer according to claim 7, wherein said i/o device comprises a mobile telephone coupled to a serial interface port of the computer.

10. A method according claim 1, further comprising using said single main driver and a physical port for said at least one input/output device to define a single virtual port for use by said at least two communications modules.

11. A method according claim 1, further comprising writing said first supplementary driver and said second supplementary driver to be several orders of magnitude smaller in size than said main driver.

12. A method according claim 11, further comprising writing said first supplementay driver and said second supplementary driver to contain not more than 50 lines of code and said main driver to contain 100,000 lines of code.

13. A method according claim 1, wherein transferring said function interface comprises transferring the address of a registration table.

14. A method according claim 1, wherein transferring said function interface comprises transferring an access address of the single main driver.

15. A computer according claim 7, wherein said single main driver and a physical port for said at least one input/output device define a single virtual port for use by said at least two communications modules.

16. A computer according claim 7, wherein said first supplementary driver and said second supplementary driver are several orders of magnitude smaller in size than said main driver.

17. A computer according claim 16, wherein said first supplementary driver and said second supplementary driver contain not more than 50 lines of code and said main driver contains 100,000 lines of code.

18. A computer according claim 7, wherein said function interface comprises the address of a registration table.

19. A computer according claim 7, wherein said function interface comprises an access address of the single main driver.

20. A method of operating a computer having a non-volatile memory, a random access memory (RAM), at least one input/output (i/o) device, and an operating system in which at least two communication modules are provided for interfacing applications running simultaneously on the computer to saud i/o device, the method comprising:

registering a first supplementary driver to a first of the communication modules, the first communication module being VCOMM or a similar module, whereupon the first supplementary driver causes a single main driver, which defines the communications protocol for said i/o device, to be loaded from the non-volatile memory to the RAM if not previously loaded and also transfers a function interface for the main driver to said first communication module; and subsequently registering a second supplementary driver to a second of communication modules, the second communication module being DeviceIOcontrol or a similar module, whereupon the second supplementary driver transfers a function interface for the same single main driver to the second communication module.

21. A storage medium for operating with a computer having a non-volatile memory, a random access memory (RAM), at least one input/output (i/o) device, and an operating system in which at least twp communications modules are provided for interfacing applications running simultaneously on the computer to said i/o device, said storage medium having recorded thereon:

a first supplementary driver for a first of the communication modules, the first communication module being VCOMM or a similar module, which defines a communications protocol for said i/o device, to be loaded from the non-volatile memory to the RAM if not previously loaded and also transfers a function interface for the single main driver to said first communications module; and a second supplementary driver for a second of the communication modules, the second communication module being DeviceIOcontrol or a similar module, whereupon the second supplementary driver transfers a function interface for the same single main driver to said second communication module.

22. In a computer having a non-volatile memory, a random access memory (RAM), at least one input/output (i/o) device, and an operating system in which at least two communications modules are provided for interfacing applications running simultaneously on the computer to said i/o device, the computer having program code which causes the computer to:

register a first supplementary driver to a first of the communication modules, the first communication module being VCOMM or a similar module, whereupon the first supplementary driver causes a single main driver, which defines a communication protocol for said i/o device, to be loaded from the non-volatile memory to the RAM if not previously loaded and also transfers a function interface for the main driver to the first communication module; and subsequently register a second supplementary driver to a second of the communication modules, the second communication module being DeviceIOcontrol or a similar module, whereupon the second supplementary driver transfers a function interface for the same single main driver to the second communication module.

* * * * *